Figure 4:
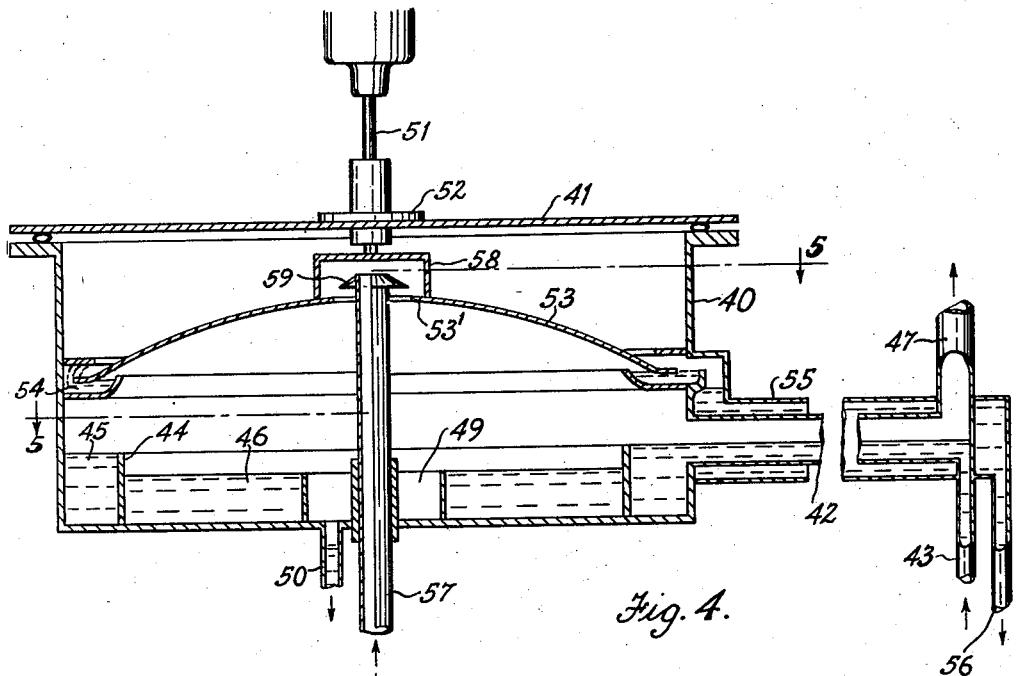

Feb. 11, 1958 T. R. A. DAVEY ET AL 2,823,111
CONTINUOUS VACUUM DISTILLATION
Filed July 12, 1954 2 Sheets-Sheet 1
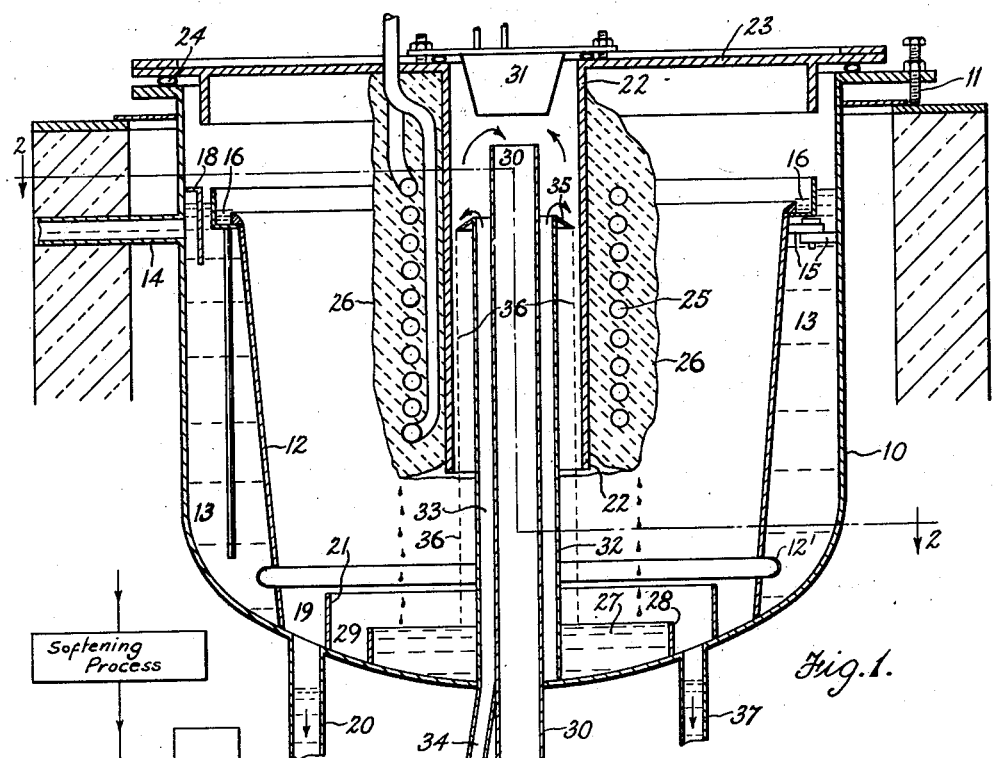
Fig.1.
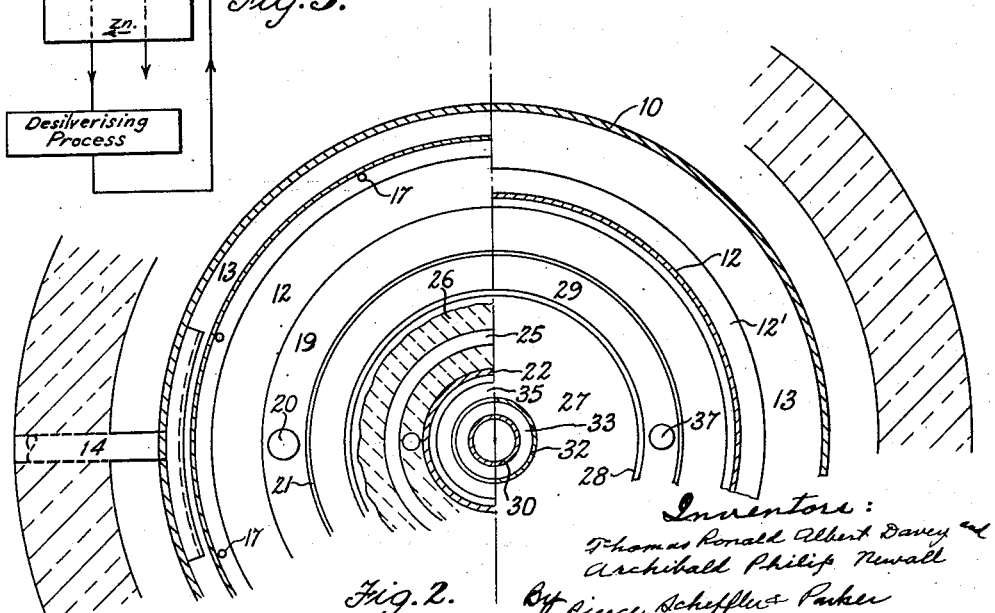
Fig.3.
Fig.2.
Inventors:
Thomas Ronald Albert Davey
Archibald Philip Newall
By Pierce, Scheffler & Parker
their Attorneys.

United States Patent Office 2,823,111
Patented Feb. 11, 1958

2,823,111

CONTINUOUS VACUUM DISTILLATION

Thomas Ronald Albert Davey, Port Pirie, South Australia, and Archibald Philip Newall, Moonah, Tasmania, Australia, assignors to The Broken Hill Associated Smelters Proprietary Limited, Melbourne, Victoria, Australia, an Australian company Application July 12, 1954, Serial No. 442,852

Claims priority, application Great Britain July 16, 1953

14 Claims. (Cl. 75—88)

This invention relates to the continuous distillation and recovery of a readily volatile constituent of a liquid and refers particularly but is not limited to the distillation of zinc from molten zinciferous lead.

The object of the invention is to provide improved methods of and means for the continuous distillation of a volatile constituent from a liquid and particularly for the separation of zinc from molten zinciferous lead.

The invention includes the method of refining a liquid complex containing a relatively volatile constituent comprising continuously passing the liquid in an attenuated condition through an evaporating zone within an evacuated space, whereby the said volatile constituent is continuously evaporated, continuously passing a second liquid at a lower temperature through the said evacuated space, continuously condensing the evaporated constituent and continuously dissolving the condensate in the said second liquid.

Thus the volatile constituent is continuously transferred within the evacuated space from the first liquid to the second liquid.

The invention is particularly useful for the separation of zinc from molten zinciferous lead, in which case the said second liquid also preferably consists of molten lead.

More particularly the invention is applicable to the refining of lead bullion which has been desilverised by means of an addition of zinc, for which purpose the said second liquid consists of softened lead which requires an addition of zinc for the subsequent desilverising operation. Thus the zinc is continuously circulated through a desilverising stage.

Preferably, some at least of the evaporated constituent is condensed directly on the said second liquid and a pool of the latter is preferably maintained within the evacuated space.

The second liquid may constitute the sole or principal condenser or alternatively it may constitute a supplementary condenser in which case a further condenser on which the vapor is condensed in the liquid condition is arranged above the pool whereby the condensate gravitates thereinto.

The expression "attenuated condition" comprehends any condition in which the free or exposed surface area of the liquid is large in proportion to its volume.

A feature of one preferred form of the invention resides in causing the second liquid to fall freely in the form of a curtain within the said enclosed space and into said pool and in withdrawing gas through the curtain whereby vapor carried by the gas will condense thereon. For this purpose the said liquid vehicle is preferably discharged into the upper end portion of a central passage in an annular condenser arranged above the pool.

A feature of another preferred form of the invention resides in centrifugally maintaining a flowing film or layer of the liquid complex above the aforesaid pool of the second liquid whereby the evaporating and condensing surfaces are disposed in opposition. For this purpose the liquid complex is supplied to a central portion of the lower surface of a spinning disc which preferably has a concave lower surface and which rotates about a substantially vertical axis.

The invention also includes the apparatus hereafter described for carrying out the aforesaid methods together with other features which also are described in the ensuing more particular description of exemplary forms of the invention.

Figure 5:
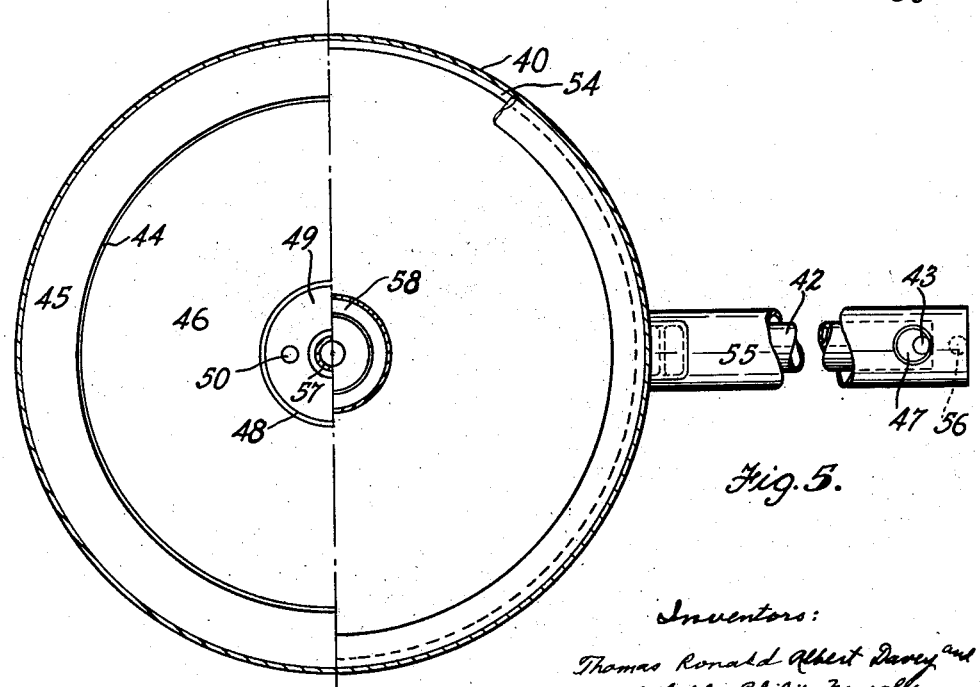

In the drawings:

Figure 1 is a somewhat diagrammatic view in sectional elevation of one form of distillation apparatus according to the invention and suitable for the separation of zinc from lead bullion, Figure 2 is a sectional plan of a part of the apparatus and is taken on the line 2—2 of Figure 1, Figure 3 is a flow sheet illustrating one application of the invention, Figure 4 is a diagrammatic view in sectional elevation of another form of apparatus embodying the invention, and Figure 5 is a sectional plan view taken on the line 5—5 of Figure 4.

The vacuum distillation apparatus shown in Figures 1 and 2 comprises a chamber 10 of vertical cylindrical form which is supported adjacent its upper end by three or more vertical adjusting screws 11. The chamber is provided internally with a vertically disposed and slightly downwardly convergent spreading or distributing tube 12 which is spaced from the wall of the chamber and is connected at its lower end to the bottom thereof so as to form therebetween a relatively deep annular well 13 to which molten desilverised lead containing zinc, is continuously supplied at a suitable temperature, e. g. about 600° C.–700° C. by a pipe 14, the discharge end of which is surrounded by a baffle box 18 which prevents the incoming bullion from splashing over the spreading tube by outgassing. A flexible joint 12[1] is provided in the lower end portion of the spreading tube and the upper end portion of the latter is directly supported on the wall of the chamber by coacting laterally projecting lugs 15. Thus by adjusting the screws 11 the upper edge of the spreading tube which constitutes an overflow weir of rounded shape in cross-section may be arranged in a horizontal plane so that the flow of molten metal thereover will be substantially uniform around its circumference.

Preferably an annular trough 16 is formed about the top of the spreading tube with the bottom of the trough disposed somewhat below the lip of the weir and bullion is supplied to this trough from the wall 13 by a plurality of equally spaced depending feed pipes 17 which are sufficiently small in diameter to produce a suitable difference between the levels of the molten metal in the well and trough.

Thus the zinciferous lead continuously overflows the upper edge of the spreading tube and passes downwardly over the inner surface thereof in the form of a thin annular stream and thence into an annular collecting channel 19 at the lower end of the vacuum chamber and is finally discharged from the latter through a pipe 20 in which a barometric column of the molten metal is maintained, the inner boundary of the collecting channel being defined by an annular wall 21.

A condenser tube 22 depends centrally from a removable cover 23 which normally closes the upper end of the vacuum chamber and is hermetically sealed thereto in any suitable manner, for example by an interposed compressible sealing ring 24.

The condenser tube 22 is open at its lower end which is disposed some distance above the bottom of the chamber as shown and a coil 25 through which water or other cooling liquid is circulated, encircles the said tube whereby when the apparatus is initially operated, the zinc which is evaporated from the molten zinciferous lead as it passes downwardly over the inner surface of the aforesaid spreading tube, is condensed in the solid condition upon the exterior of the condenser tube and around the cooling coil thereon. This deposit 26 of solid zinc progressively builds up as the operation continues, so that its outer surface progressively approaches the evaporating zone and this operation continues until, due to the proximity of the surface of the solid zinc 26 to the spreading tube, the zinc is finally condensed thereon in the liquid condition as described in the specification of U. S. Letters Patent No. 2,720,456, issued October 11, 1955.

Thus during normal operation, the surface of the condenser is maintained at the temperature of the melting point of zinc, viz. 420° thereby providing automatically the accurate temperature control which is necessary for the efficient separation of zinc from lead.

Although the crust 26 of solid zinc in which the cooling coil 25 is embedded and which constitutes the normal condenser, is preferably formed in situ as described, it will be evident that it could if desired, be preformed.

A comparatively shallow and relatively large diameter pool 27 of softened lead bullion is maintained at the bottom of the vacuum chamber below the solid zinc condenser 26 which is confined within an annular wall 28 which extends upwards from the bottom of the chamber somewhat inwardly of the aforesaid inner wall 21 of the collecting channel 19 so that a second annular channel 29 is formed therebetween.

Thus the liquid zinc condensed on the surface of the solid zinc condenser 26 flows downwardly thereover and then drops therefrom into the pool 27 of softened bullion.

A vertical vacuum pipe 30 of comparatively small diameter extends upwardly through the center of the bottom of the vacuum chamber and through the said pool 27 therein and then centrally into the condenser tube 22 the upper end of the vacuum pipe being open and disposed close to a water cooled cover 31 which in the illustrated construction closes and hermetically seals the upper end of the condenser tube. The water-cooled cover 31 thus serves as a cold trap for zinc vapor carried by the air or gas as it is about to enter the upper end of the vacuum pipe.

A second tube 32 arranged concentrically about the vacuum pipe 30 is sealed at its lower end to the bottom of the chamber, while its open upper end is disposed some distance below the top of the vacuum pipe but within and substantially above the lower end of, the condenser tube. This second tube 32 is substantially smaller in diameter than the interior of the condenser tube and the annular space between it and the vacuum pipe forms a supply passage 33 for the softened bullion, which is supplied thereto by a supply pipe 34 which communicates with the lower end thereof.

The softened lead bullion thus passes upwardly within the tube 32 around the vacuum pipe 30 and is discharged over a circumferential spreader lip 35 at the upper end of the former whereby it flows downwardly in the form of an annular curtain 36 over the inner surface of the condenser tube 22 and then drops freely into the aforesaid collecting pool 27.

It will be apparent that the gases withdrawn from the vacuum chamber through the vacuum pipe 30 pass inwardly below the solid zinc condenser 26 thence through the curtain of falling lead bullion within the condenser tube 22, then upwardly through the latter and finally again outwardly through the curtain into the upper end of the vacuum pipe thereby ensuring the practically complete transfer of evaporated zinc to the softened bullion, while any residue of vapour is condensed in the solid condition on the aforesaid cold trap constituted by the water cooled cover 31 for the upper end of the condenser tube.

The lead bullion forming the pool 27 thereof continuously overflows the annular retaining wall 28 therefor to enter the annular channel 29 and is continuously discharged from the latter through a pipe 37 in which a barometric column of the metal is maintained.

In operation, the pressure maintained within the chamber is below 500 microns of mercury, and is preferably below about 100 microns, and the major portion of the zinc evaporated from the surface of the spreading tube 12 is condensed in the liquid form on the surface of the solid zinc condenser 26 and flows downwards thereover until it drops into the pool 27.

While as stated the major portion of the evaporated zinc is condensed on the solid zinc condenser 26, some and particularly that which is evaporated at or near the lower end of the spreading tube is condensed on the falling curtain 36 of softened bullion immediately below or within the condenser. In addition some zinc is probably condensed directly on the surface of the pool.

It will be evident that if the rate of condensation of zinc remains constant, the proportion thereof contained in the softened bullion discharged from the chamber through the pipe 37 may be regulated by varying the rate of flow of the softened bullion.

Preferably, the conditions are controlled so that the thickness of the zinc collar is at least one-tenth of the diameter of the distributing surface. Thus, in one run with the generally similar type of vacuum chamber illustrated in Figure 1 of the aforesaid prior specification, desilverised lead bullion at a temperature of approximately 650° C. and containing 0.56% zinc was supplied to the chamber at the rate of 5–6 tons per hour. The distributing tube 12 was 30 inches in internal diameter at the top, 24 inches in diameter at the bottom and 30 inches high, while the condenser tube was approximately 6 inches in maximum diameter and the zinc collar 26 had an outside diameter of approximately 12 inches and was therefore 3 inches in thickness. An indicated vacuum of 100 microns of mercury was maintained within the chamber and the dezinced bullion was discharged from the lower end of the chamber at a temperature of 600° C. and contained about 0.05% zinc, i. e. a recovery of about 90% of input zinc was obtained.

In order to obtain a useful recovery of zinc in the liquid form, the temperature of the condensing surface must not be allowed to rise much above the melting point of zinc, i. e. 420° C., because the vapor pressure of pure zinc at this temperature is 155 microns and it increases rapidly with the temperature so that at 430° C., for example, the vapor pressure is 210 microns. Accordingly, when the pressure maintained within the chamber is less than 100 microns, re-evaporation of liquid zinc will take place rapidly if the temperature thereof is materially above 420° C. Also the partial pressure of zinc in lead bullion containing 0.05% zinc at a temperature of 600° C. is 185 microns so that distillation of zinc will not proceed from the bullion to the condenser unless the temperature of the latter is prevented from rising materially above 420° C. This requirement is fulfilled by the present invention because as already explained the surface of the solid zinc condenser 26 is automatically at 420° C.

The above-described method and apparatus of the present invention provide the following advantages:

(a) The hollow solid zinc condenser 26 enables a curtain 36 of softened bullion to be maintained therein to serve as a cold trap for zinc vapor.

(b) Softened bullion 36 containing practically no zinc is utilised to serve as the condensing medium adjacent to the desilverised bullion at the lower end portion of the evaporating zone where its zinc content is lowest. The distillation rate in that region is therefore increased so as to obtain the effect of counter-current flow, notwithstanding that the two bullion streams flow downwards within the chamber.

(c) The condensation of the major portion of the zinc vapor on the solid zinc condenser 26 obviates the necessity for controlling the temperature of the softened bullion within the chamber which would otherwise require to be cooled by an amount depending on the temperature and flow rate of the desilverised bullion.

(d) No accurate temperature controls are necessary although dezinced bullion must be discharged at a temperature approximating 600° C. to ensure a high recovery of zinc therefrom. Also the temperature of the softened bullion entering the chamber should at times exceed 420° C. in order to melt any zinc deposits which may form on the outer surface of the softened bullion supply pipe 31. The molten metal in the pool 27 should at all times exceed the temperature at which zinc-silver compound begins to separate, e. g. 415° C. for bullion containing 60 ozs. silver per ton and 0.51% zinc.

Figure 3 is a flow sheet showing the invention applied to the removal of zinc from desilverised lead bullion and the transfer of the recovered zinc to bullion which has been softened and which is subsequently subjected to the desilverising treatment. The zinc thus circulates in a closed system which includes the desilverising stage so that the vacuum distillation apparatus serves as a zinc exchanger. The indicated softening and desilverising operations are preferably carried out continuously according to known methods though alternatively they may be batch or intermittent operations in which case holding vessels are provided to serve as reservoirs of the molten metals and permit of continuous flows of desilverised bullion and softened bullion through the vacuum chamber 10.

The alternative form of apparatus shown in Figures 4 and 5 comprises a vacuum chamber 40 of vertical cylindrical form provided at its upper end with a removable cover 41 which is normally sealed to the body of the chamber, for example, in the manner previously described.

A horizontal metal pipe 42 for the supply of softened bullion to the chamber projects radially from one portion of the periphery of the latter and the outer end of this pipe is connected to the upper end of a vertical pipe 43 through which the softened bullion is supplied to the chamber.

An annular wall 44 which projects upwardly from the bottom of the chamber 40 is disposed somewhat inwardly of the wall of the chamber to form therebetween an annular well 45 which receives the softened bullion discharged from the radial pipe 42.

When the apparatus is in normal operation, the bullion continuously overflows the annular wall 44 and thus passes into a central pool 46 of large diameter which is confined within the said wall.

The upper edge of the said circular wall is disposed some distance below the level of the top of the said radial supply pipe 42, thereby ensuring that the latter is never completely full. Thus a free space for the removal of gases from the chamber is maintained in the said pipe 42 above the bullion therein and a vacuum off-take pipe 47 communicates with and extends upwardly from the outer end thereof.

The pool 46 of softened bullion is confined at its inner periphery by a further annular wall 48 which projects upwardly from the bottom of the vacuum chamber and its height is somewhat less than that of the outer concentric wall 44.

Thus the pool is of annular shape in plan and the softened bullion together with the zinc which is condensed thereon during the operation of the apparatus, continually overflows the inner wall 48 into a central discharge basin 49 connected to a discharge pipe 50 in which a barometric column of the molten metal is normally maintained. Thus the said inner wall 48 determines the depth of the pool.

A vertical spindle 51 extends centrally into the vacuum chamber through a suitable seal 52 in the removable cover 41 thereof and a large circular disc 53 is secured to its lower end within the vacuum chamber. The diameter of the disc is only a little less than that of the chamber and when the apparatus is in use the disc is rotated continuously at a suitable speed by an electric motor (not shown), which is coupled to the upper end of the spindle.

The disc is concave on its lower face and the outer periphery thereof extends into an annular channel 54 formed on the wall of the vacuum chamber and which is normally full of dezinced bullion.

The said annular channel 54 discharges into an outlet pipe 55 arranged concentrically about the aforesaid radial supply pipe 42 and having its outer end connected to a discharge pipe 56 in which also a barometric column of the molten metal is normally maintained.

A supply pipe 57 for desilverised bullion which contains the zinc to be removed, extends vertically upwards through the centre of the bottom of the vacuum chamber in coaxial alignment with the rotatable disc 53 and its upper end extends into a circular recess 58 formed centrally in the lower face of the disc 53 and is formed with an outwardly extending and somewhat outwardly and downwardly inclined annular lip 59 over which the desilverised bullion is discharged within the said recess.

The lower end of the recess is formed with an inwardly projecting annular flange $53^1$ which forms a retaining ledge for the molten lead thus discharged from the supply pipe. The molten metal which drops onto this retaining ledge is caused to rotate with the disc and consequently continuously overflows the inner periphery thereof due to the combined effects of gravity and centrifugal action. Preferably the central opening defined by the inner periphery of the annular retaining ledge $53^1$ is somewhat larger than the diameter of the aforesaid annular lip 59 on the upper end of the supply pipe 57 so as to facilitate the assembly and dismantling of the apparatus.

The metal supplied as above described to the centre of the spinning disc 53 is projected outwardly by centrifugal action and thus forms thereon a substantially continuous thin layer which is maintained in contact with the disc due to the downwardly concave formation of the latter.

The bullion thus passes outwardly over the lower surface of the disc and thence from the periphery of the latter into the annular channel 54 from which it passes through the radial outlet pipe 55 to the discharge pipe 56.

The temperature of the desilverised bullion supplied as above described to the lower surface of the spinning disc 53 is preferably at or about 680° C. while the pool of molten softened bullion disposed therebelow preferably has a temperature of about 420° C. Accordingly, as the thin layer of desilverised bullion passes outwardly over the spinning disc, the zinc contained therein is progressively evaporated and is condensed on the surface of the relatively cool pool 46 of softened bullion disposed therebelow and in relatively close proximity thereto.

This apparatus has the advantage that the evaporating zone defined by the lower surface of the spinning disc is disposed above and approximately parallel to the condensing surface of the pool so that vapor which condenses before it enters the pool falls into the latter and not back into the evaporating zone.

Also the desilverised bullion flows radially outwards within the chamber 40 while the softened bullion flows radially inwards into and through the pool, and these counter-current flows result in low zinc condensing bullion being disposed opposite to the low zinc evaporating bullion to ensure a high zinc recovery.

Similarly the flow of incoming softened bullion through the pipe 42 is in counter-current to the gases withdrawn through the same pipe, so that any residual zinc vapor not condensed in the chamber is progressively condensed upon the incoming bullion which has a negligibly small zinc-partial pressure. Thus very little zinc enters the vacuum off-take pipe 47, though if required a cold trap (not shown) may be provided therein.

Furthermore, as the outlet pipe 55 for the dezinced bullion surrounds the radial pipe 42 which serves both for the inflow of softened bullion and for the removal of gases from the chamber, the wall of the pipe 42 is maintained at a sufficiently high temperature (app. 580° C.) to prevent thereon condensation in the solid form of zinc vapor. The zinc vapor thus carried into the said radial pipe 42 with the gases will, however, condense on and dissolve in, the aforesaid softened bullion which passes inwardly therethrough at a temperature of about 400° C.

With a vacuum of 50–100 microns, desilverised bullion at a temperature of 680° C., and the softened bullion in the pool 46 at a temperature of about 420° C., the surface of the disc 53 should be about 0.33 sq. ft. for each 1 ton/hour bullion flow, i. e. about 10 sq. ft. for 30 ton/hour treatment rate. Under these conditions the zinc content of evaporating bullion will fall from 0.56% to 0.05% and that of condensing bullion will rise from 0% to 0.51%. If the softened bullion contains about 60 ozs./ton silver, it is necessary to keep its temperature above 415° C. to prevent silver-zinc compound from crystallising out and blocking the discharge pipe 50.

This application is a continuation-in-part of our application Serial No. 359,457, filed June 4, 1953, now Patent No. 2,720,456, granted October 11, 1955, which in turn is a continuation-in-part of our application Serial No. 174,484, filed July 18, 1950, now abandoned.

We claim:

1. The method of refining a liquid complex containing a relatively volatile constituent comprising continuously passing the liquid in an attenuated condition into and through an evaporating zone within an evacuated space, whereby the said constituent is continuously evaporated, continuously passing a second liquid at a lower temperature into and through the evacuated space, continuously condensing the vaporised constituent and continuously dissolving the condensate in the said second liquid.

2. The method of refining a liquid complex containing a relatively volatile constituent comprising continuously passing the liquid in an attenuated condition into and through an evaporating zone within an evacuated space whereby the said constituent is continuously evaporated, continuously passing a second liquid at a lower temperature into and through the evacuated space in a path spaced from and disposed approximately parallel and approximately in opposition to the evaporating zone, whereby the said second liquid serves as a condenser, continuously condensing the evaporated constituent and continuously dissolving the condensate in the said second liquid.

3. The method according to claim 2 wherein the evaporating zone is approximately cylindrical in form and extends substantially vertically and wherein the first-mentioned liquid flows downwardly therethrough and the said second liquid flows downwardly approximately centrally within the evaporating zone.

4. The method according to claim 2 wherein a substantial proportion of the evaporated constituent is condensed in the liquid condition on the surface of a mass of the said constituent in the solid form and the said mass is arranged above a pool of the said second liquid whereby the liquid condensate gravitates from the solid mass into the pool.

5. The method according to claim 2 wherein a pool of the said second liquid is maintained within the evacuated space to collect and serve at least partly as a condenser for the evaporated constituent.

6. The method according to claim 2 wherein the evaporating zone is vertically elongated and the first liquid gravitates therethrough and the said second liquid gravitates to a collecting pool therefor and wherein a vertically elongated mass of the said constituent in the solid form is maintained above the pool and between the evaporating zone and the descending flow of the second liquid whereby the evaporated constituent condenses in the liquid condition on the said mass and gravitates therefrom into the pool.

7. The method according to claim 2 wherein the said liquid complex is lead containing zinc and the said second liquid is lead substantially free of zinc.

8. Apparatus for refining a liquid complex containing a relatively volatile constituent comprising a chamber provided with inlet and discharge passages for the liquid, means for maintaining the interior of said chamber at sub-atmospheric pressure, an evaporating zone within the chamber, means for directing the liquid to and through the evaporating zone and thence to the said discharge passage, inlet and discharge passages for a second liquid having a lower temperature and means for directing the second liquid from the inlet to the discharge passage therefor through a path which is spaced from the evaporating zone and is so disposed that some at least of the evaporated constituent is condensed on the surface thereof and substantially all of the condensate is dissolved therein.

9. Apparatus for refining a liquid complex containing a relatively volatile constituent comprising a chamber provided with spaced inlet and outlet passages for the said liquid, means for maintaining the interior of said chamber at sub-atmospheric pressure, means within the chamber for directing the liquid to and causing it to pass in the form of a thin stream through an evaporating zone, inlet and outlet passages for a second liquid having a lower temperature, means defining a pool for the second liquid within the chamber and means for directing the incoming second liquid through the chamber in a path which includes the pool and is spaced from the evaporating zone, and wherein the pool is so disposed that the evaporated constituent is condensed on the surface thereof and dissolved therein.

10. Apparatus for refining a liquid complex containing a relatively volatile constituent comprising a chamber provided with spaced inlet and outlet passages for the said liquid and with spaced inlet and outlet passages for a second liquid, means for maintaining the interior of said chamber at sub-atmospheric pressure, a substantially cylindrical vertically disposed spreading tube within the chamber, means for directing the incoming first mentioned liquid to the upper end of the spreading tube whereby it flows over the inner surface thereof in the form of a thin stream, a vertically extending hollow condenser arranged centrally within the spreading tube, the outer portion at least of the condenser being composed of the said volatile constituent in the solid condition, means defining within the chamber and below the condenser, a receptacle for a pool of the said second liquid and means for delivering the second liquid to the hollow interior of the condenser whereby it gravitates therethrough to the said pool.

11. Apparatus according to claim 10 including means within the hollow condenser whereby the second liquid descends therein in the form of an annular curtain.

12. Apparatus according to claim 10 including means forming a vacuum off-take passage communicating with the interior of the hollow condenser above the position at which the said second liquid is delivered thereinto.

13. Apparatus according to claim 10 wherein the spreading tube is spaced from the wall of the chamber whereby an annular well for the incoming liquid is formed therebetween and including an annular trough surrounding the upper end portion of the spreading tube and a plurality of restricted feed pipes depending from the trough into the said well.

14. The method of refining a liquid complex containing a relatively volatile metal constituent comprising continuously passing the liquid in an attenuated condition into and through an evaporating zone within an evacuated space under such conditions that the said volatile metal constituent is continuously evaporated, continuously passing a second metal in liquid form at a lower temperature into and through the evacuated space in a path spaced from and disposed approximately parallel and approximately in opposition to the evaporating zone, whereby the said second liquid metal serves as a condenser, continuously condensing the evaporated metal constituent and continuously dissolving the resulting condensate in said second liquid metal and separately removing the resulting solution from said evacuated space.

References Cited in the file of this patent

UNITED STATES PATENTS

| | | |
|---|---|---|
| 2,238,819 | Neve | Apr. 15, 1941 |
| 2,239,371 | Osborn et al. | Apr. 22, 1941 |
| 2,671,725 | Robson et al. | Mar. 9, 1954 |
| 2,720,456 | Davey | Oct. 11, 1955 |